(12) United States Patent
Nishimura et al.

(10) Patent No.: US 7,588,374 B2
(45) Date of Patent: Sep. 15, 2009

(54) OPTICAL FERRULE AND MANUFACTURING METHOD THEREOF

(75) Inventors: Akito Nishimura, Chiba (JP); Kunihiko Fujiwara, Chiba (JP); Takahiko Sabano, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/244,560

(22) Filed: Oct. 2, 2008

(65) Prior Publication Data

US 2009/0097801 A1 Apr. 16, 2009

(30) Foreign Application Priority Data

| Oct. 5, 2007 | (JP) | ............................. 2007-262645 |
| Sep. 4, 2008 | (JP) | ............................. 2008-227473 |

(51) Int. Cl.
  G02B 6/36 (2006.01)
  G02B 6/38 (2006.01)
(52) U.S. Cl. .............................. 385/60; 385/63; 385/78
(58) Field of Classification Search ........................ None
  See application file for complete search history.

(56) References Cited

U.S. PATENT DOCUMENTS 6,210,047 B1 * 4/2001 Grois et al. .................... 385/83
6,565,265 B2 * 5/2003 Ohtsuka et al. ................ 385/78
6,769,811 B2 * 8/2004 Hall et al. ...................... 385/59

FOREIGN PATENT DOCUMENTS

| JP | 09-325241 B2 | 12/1997 |
| JP | 1172650 A | 3/1999 |
| JP | 2001-083367 A | 3/2001 |
| JP | 2001208936 A | 8/2001 |
| JP | 2002156553 A | 5/2002 |
| JP | 2002174749 A | 6/2002 |
| JP | 2002270808 | 9/2002 |
| JP | 2004-157339 A | 6/2004 |
| JP | 2004109398 A | 6/2004 |
| JP | 3763885 B2 | 1/2006 |

* cited by examiner

*Primary Examiner*—Omar Rojas
(74) *Attorney, Agent, or Firm*—Sughrue Mion, PLLC

(57) ABSTRACT

An optical ferrule includes a positioning block and a ferrule main body. The ferrule main body is integrally formed by molding a resin over the positioning block. The positioning block includes an optical fiber insertion hole formation portion having optical fiber insertion holes and guide pin hole formation portions which are provided on both sides of the positioning block and which have guide pin holes. On a front end side of the ferrule main body, the positioning block is disposed. The ferrule main body has a hollow part on its rear end side.

11 Claims, 6 Drawing Sheets

OPTICAL FERRULE AND MANUFACTURING METHOD THEREOF

CROSS REFERENCE TO RELATED APPLICATION

This application claims the benefits of priority under 35 U.S.C. §119 to Japanese Patent Application Nos. 2007-262645 filed on Oct. 5, 2007 and 2008-227473 filed on Sep. 4, 2008, the entire contents of which are incorporated by reference herein.

BACKGROUND OF THE INVENTION

1. Field of the Invention

The present invention relates to an optical ferrule having a plurality of optical fiber insertion holes and guide pin holes, and a manufacturing method thereof.

2. Description of the Related Art

As a conventional optical ferrule, there is an optical ferrule used for an optical connector (JIS C 5981: corresponding to an F12 type multicore optical fiber connector) which is generally called an MT connector and which uses a fitting pin positioning method. This optical ferrule has an approximately rectangular structure including optical fiber insertion holes arranged in a row and guide pin holes for positioning on both sides thereof. Generally, from the viewpoint of productivity and costs, the MT connector is integrally molded by transfer molding or injection molding using resin.

If an optical ferrule has a structure integrally molded, the productivity of the optical ferrule is improved. However, there is a problem that such optical ferrule has a complicated mold structure. Moreover, there is also a problem that it is difficult to manufacture a high-precision product with high yield.

Japanese Patent Application Laid-Open Publication No. 2002-156553 (Japanese Patent No. 3574620, Patent Document 1) discloses an optical ferrule manufactured by taking into consideration the problems described above. According to Patent Document 1, as shown in FIGS. 1 and 2, an optical ferrule 3 has a positioning block 1 and a ferrule main body 2. The positioning block 1 is previously resin-molded so as to allow highly accurate formation of a plurality of optical fiber insertion holes 1a and guide pin holes 1b on both sides thereof. The ferrule main body 2 is formed by molding a resin over the positioning block 1. On upper and lower surfaces of the positioning block 1, protrusions 1c are formed. In the ferrule main body 2, formed are: a hollow part 4 including an optical fiber introduction opening 4a and an adhesive filling window 4b; and guide grooves 5 facing the optical fiber insertion holes 1a.

As described above, the optical ferrule 3 is formed by molding the resign over the positioning block 1. Therefore, when accuracy of an arrangement pitch or holes for the optical fiber insertion holes 1a and the guide pin holes 1b in the positioning block 1 is improved, not very high accuracy is required for the ferrule main body 2. Moreover, since the resin molding for the ferrule main body 2 is easy, there is an advantage that an inexpensive optical ferrule can be manufactured.

For a general optical ferrule that is integrally molded so as to include optical fiber insertion holes, high-precision molding is difficult. One of the reasons for this difficulty is that the resin in the ferrule is unevenly distributed to cause distortion of the ferrule during shrinkage on curing of the resin.

A mold structure for preventing deterioration in the accuracy is expensive and requires a complicated manufacturing process. Therefore, there arises a problem that yield for molding is significantly lowered and that manufacturing costs are significantly increased.

Regarding the above problem, in Patent Document 1, a block is prepared for positioning optical fibers, for which high accuracy is required. Thereafter, a frame body is formed around the block by overmolding. Specifically, a portion including the optical fiber insertion holes, for which high accuracy is required, and other portions are separately manufactured. The accuracy is more easily improved in the optical ferrule disclosed in the above document than in the general integrally molded optical ferrule. Furthermore, management of the manufacturing process and also the mold structure are simplified. Thus, the yield is improved and the optical ferrule can be manufactured at low cost.

The arrangement of the optical fiber insertion holes is not limited to one-dimensional arrangement including only one row of optical fiber insertion holes (one optical fiber insertion hole array) as shown in FIG. 2, and may be two-dimensional arrangement having a plurality of optical fiber insertion hole arrays.

SUMMARY OF THE INVENTION

There has been a demand for significant reduction in optical connection loss. In order to meet this demand, it is required to further improve accuracy of optical fiber insertion holes and fitting pin holes formed in the positioning block.

However, in the positioning block (described as a chip unit) which is made of resin in the optical ferrule disclosed in Patent Document 1, the protrusions are formed on the upper and lower surfaces thereof. Thus, the shape of the positioning block is complicated. This complicated shape disturbs the accuracy of the optical fiber insertion holes and the fitting pin holes.

Particularly, according to Patent Document 1, the shrinkage on curing of the resin is uneven in resin molding of the chip unit. Thus, a slight error is caused in the accuracy of the optical fiber insertion holes and the fitting pin holes. Therefore, due to this slight error, the significant reduction in optical connection loss can no longer be easily achieved.

The present invention was made to solve the foregoing problems. It is an object of the present invention to facilitate manufacturing of a high-precision positioning block by forming the positioning block into a proper shape, and also to achieve improvement in accuracy at low cost. Moreover, it is also an object of the present invention to provide positioning block shapes suitable for one-dimensional arrangement and two-dimensional arrangement of optical fiber insertion holes, respectively.

An aspect of the present invention is an optical ferrule comprising: a positioning block including an optical fiber insertion hole formation portion having optical fiber insertion holes and guide pin hole formation portions which are provided on both sides of the optical fiber insertion hole formation portion and which have guide pin holes; and a ferrule main body having the positioning block disposed on a front end side of the ferrule main body and having a hollow part on a rear end side of the ferrule main body. The optical fiber insertion hole formation portion and the guide pin hole formation portions are integrally formed, and the ferrule main body is integrally formed by molding a resin over the positioning block. In addition, a front end face of the positioning block is a connection end face, and the hollow part is positioned behind the positioning block. Moreover, the optical fiber insertion holes penetrate the positioning block in a front-back direction and thus have their one ends opened in the connection end face and other ends opened in the hollow part. Furthermore, the guide pin hole formation portions are formed so as to protrude outward from the both sides of the optical fiber insertion hole formation portion and to have arc-shaped contour portions.

In the optical ferrule described above, it is preferable that each of the contour portions is formed so as to have an arc shape which is concentric to the guide pin hole and which has a center angle larger than 180 degrees and that a vertical width of the optical fiber insertion hole formation portion is smaller than that of each of the guide pin hole formation portions.

In the optical ferrule according to the present invention, it is preferable that, when two intersection lines between a plane including a front end face of the positioning block and a plane including an upper surface of the positioning block and between the plane including the front end face of the positioning block and a plane including a lower surface of the positioning block are set as first and second intersection lines, respectively, while two vertical lines which are perpendicular to the first and second intersection lines and tangent to the guide pin hole formation portions are set as first and second vertical lines, respectively, a cross-sectional area of the positioning block when viewed in the front-back direction is smaller than an area surrounded by the first and second intersection lines and the first and second vertical lines.

In the optical ferrule according to the present invention, it is preferable that connected portions between the guide pin hole formation portions and the optical fiber insertion hole formation portion have a round shape.

In the optical ferrule according to the present invention, it is preferable that edges of upper and lower surfaces of the positioning block have a round shape.

DETAILED DESCRIPTION OF THE PREFERRED EMBODIMENTS

With reference to the drawings, an optical ferrule to which the present invention is applied will be described below.

First Embodiment

Figure 3:
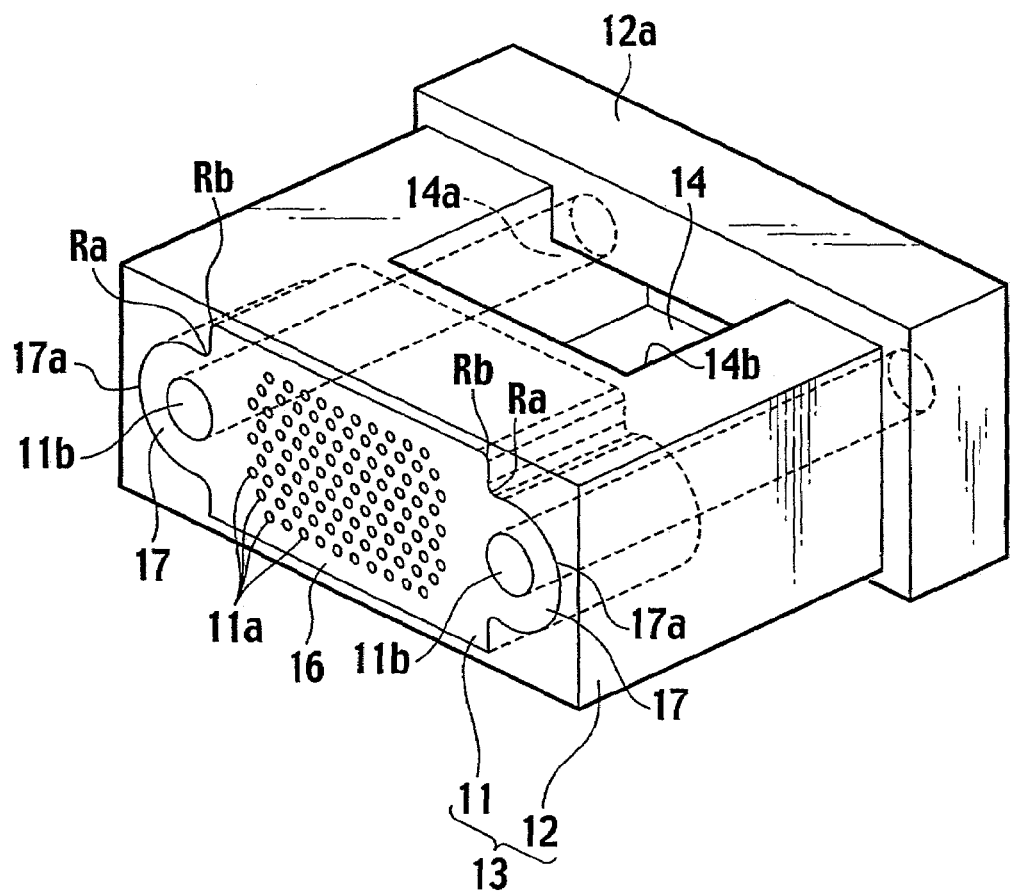
FIG. 3 is a perspective view showing an optical ferrule according to an embodiment of the present invention.

As shown in FIG. 3, an optical ferrule 13 according to an embodiment of the present invention is formed of a positioning block 11 and a ferrule main body 12 formed by molding a resin over the positioning block 11 with resin.

Note that, in the following description, a connection end face side of the optical ferrule is called a front side, an opposite side is called a rear side, an end face on the front side is called a front end face, and an end face on the opposite side is called a rear end face. A vertical direction approximately indicates a vertical direction on the page in FIGS. 3 and 4, and a horizontal direction approximately indicates a horizontal direction on the page in FIGS. 3, 4 and 6.

The positioning block 11 is a resin-molded component. The positioning block 11 has a plurality of optical fiber insertion holes 11a and guide pin holes (also called fitting pin holes) 11b formed on both sides of a region where the optical fiber insertion holes 11a are formed.

Figure 4:
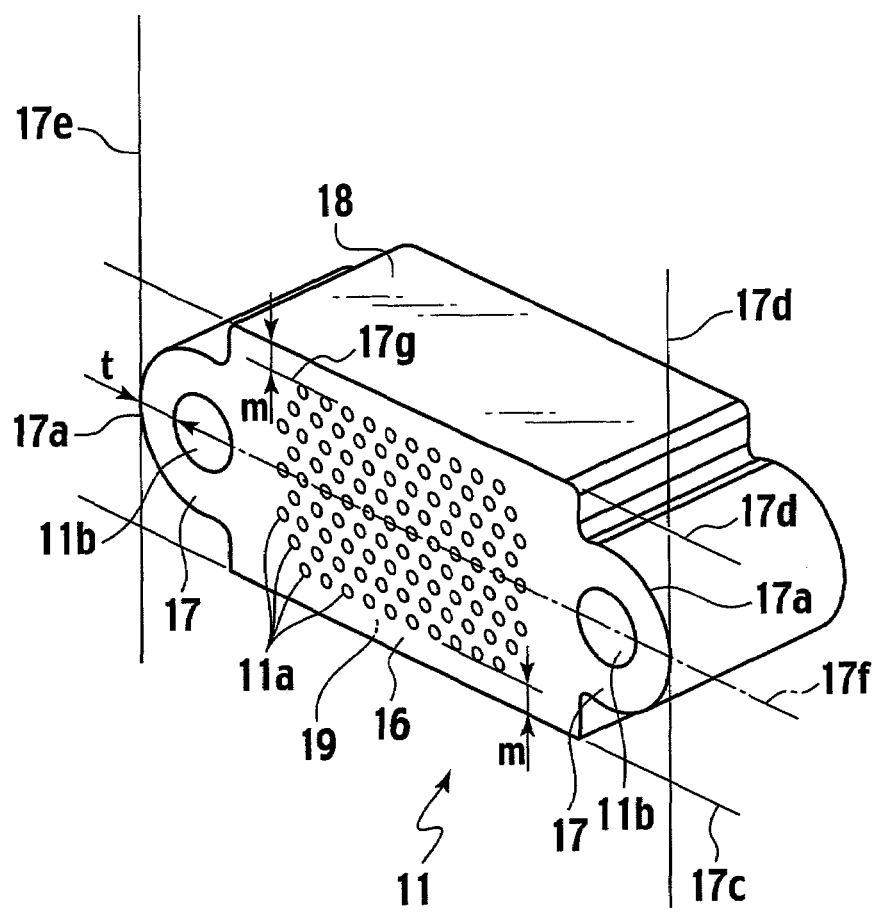
FIG. 4 is a perspective view showing only a positioning block in FIG. 3.

As shown in FIG. 4, the positioning block 11 is vertically symmetrical, when viewed from the connection end face side, about a line segment (equivalent to a horizontal transversal line 17f in FIG. 4) which horizontally traverses the center of a space between an upper surface 18 and a lower surface 19. Moreover, the positioning block 11 is horizontally symmetrical about a line segment vertically traversing the center of a space between left and right ends (a line segment perpendicular to the horizontally traversing line segment). Note that the horizontal symmetry and vertical symmetry of the positioning block 11 are common to all the embodiments.

In a connection end face, optical fiber insertion hole arrays including the plurality of optical fiber insertion holes 11a are formed in rows. As shown in FIG. 4, the optical fiber insertion hole arrays are parallel to each other. Note that the present invention is not limited to the number of arrays shown in FIG. 4.

Here, the horizontal symmetry and the vertical symmetry can include not only a contour of the positioning block when viewed from the connection end face side but also an arrangement configuration of the optical fiber insertion holes in the connection end face.

Hereinafter, a region having a rectangular cross-section in which the optical fiber insertion holes 11a are formed will be referred to as an optical fiber insertion hole formation portion 16 and regions in which the guide pin holes 11b are formed on both sides of the optical fiber insertion hole formation portion 16 will be referred to as guide pin hole formation portions 17.

The guide pin hole formation portions 17 protrude from the both sides of the optical fiber insertion hole formation portion 16 so as to follow the circular shape of the guide pin holes 11b. A contour portion 17a of each of the guide pin hole formation portions 17 is formed to have an arc shape. Specifically, the contour portion 17a forms a part of a circumference.

In another expression, the guide pin hole formation portions 17 protrude outward from the both sides of the optical fiber insertion hole formation portion 16 so as to have an ear-shaped external appearance. The center of the arc shape of the contour portion 17a is concentric to the guide pin hole 11b and thus a wall thickness t (see FIG. 4) around the guide pin hole 11b in the guide pin hole formation portion 17 is approximately uniform. Here, the wall thickness t means a width for which the horizontal transversal line 17f traverses the guide pin hole formation portion 17, the horizontal transversal line 17f traversing the center in the vertical direction of the positioning block 11, in FIG. 4.

In the positioning block 11, it is preferable that a difference between the wall thickness t and a thickness m is small. Here the thickness m is a thickness between the uppermost or lowermost array of the optical fiber insertion holes 11a and the upper surface 18 or the lower surface 19 of the positioning block 11. Furthermore, the thickness m is defined as a distance between a line segment 17g and each of the upper and lower surfaces 18 and 19 of the positioning block 11, the line segment 17g connecting outer edges of the rows of the optical fiber insertion holes, and it is most preferable that the thickness m is almost the same as the wall thickness t. These dimensions (the wall thickness t and the thickness m) are set according to a distance between a core of a mold and an inner wall of a mold main body having the core provided therein.

Boundaries (connected portions, intermediate portions) Ra between the optical fiber insertion hole formation portion 16 and the guide pin hole formation portions 17 are formed so as to have a round shape. The round shape of the boundaries can reduce stress and strain generated in curing the resin.

Furthermore, corners Rb in both edges of the upper and lower surfaces of the positioning block 11 may also be formed to have a round shape. The round shape means a curved shape and can also be said to be a tapered shape. The corners having such a shape result in a smooth contour of the positioning block 11. Thus, stress and strain generated after molding can be suppressed. As a result, molding accuracy of the optical fiber insertion holes and the pin holes can be secured.

Only chamfering of the connected portions may also be effective in preventing generation of the stress and strain. Therefore, the term "round shape" defined in the present invention also includes a structure in which two planes forming the connected portion Ra and the corner Rb are connected by at least one plane.

Note that a front end face of the positioning block 11, the front end face serving as a connection end face of an optical connector, is set to have a smooth surface.

Moreover, as in the case of a general optical ferrule, entrances of the optical fiber insertion holes 11a, the entrances being positioned at a rear end side, are set to be tapered openings so as to facilitate insertion of optical fibers.

Figure 6:
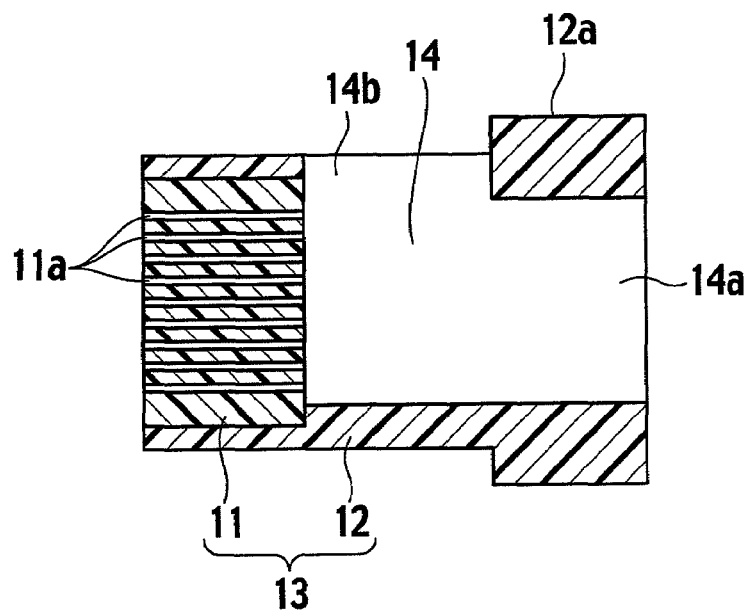
FIG. 6 is a longitudinal cross-sectional view of the optical ferrule in FIG. 3.

Furthermore, it is preferable that the positioning block 11 has a cross-sectional shape uniform in a front-back direction of the ferrule (the horizontal direction in FIG. 6).

The ferrule main body 12 formed by molding another resin over the positioning block 11 has a hollow part 14 including an optical fiber introduction opening 14a and an adhesive filling window 14b, and also has a flange 12a on the rear end side of the optical ferrule (the right end side in FIG. 6).

However, in the case of an optical ferrule having a structure in which no adhesive is filled from a side face of the optical ferrule, the adhesive filling window 14b is not necessary.

In the case of resin molding of the optical ferrule 13 described above, first, the positioning block 11 is disposed in a cavity formed by use of upper and lower molds.

Thereafter, a core of a mold for forming a portion except the adhesive filling window 14b in the hollow part 14 is disposed. This core of the mold has a convex portion to be a portion of the adhesive filling window 14b. As a matter of course, in the case of a molded component having no adhesive filling window 14b, a mold having no convex portion is used.

At a front end of the core, two metal rod-shaped pin parts having a circular cross-section protrude. These pin parts are trimming dies for forming guide pin holes in the ferrule main body 12.

Therefore, in the molded component, guide pin holes 21b are formed so as to penetrate the ferrule main body 12 in the front-back direction. This structure is the same also in a second embodiment to be described later.

As is generally known, the guide pin holes are larger than the optical fiber insertion holes.

When tips of the two pin parts are inserted into the guide pin holes 11b of the positioning block 11, formed is a structure in which the positioning block 11 is supported just on the tips of the mold pins.

Subsequently, the mold is closed while maintaining the structure described above, and a resin is injected into the cavity through a resin injection part of the mold.

Accordingly, the ferrule main body 12 is formed by molding the resin over the positioning block 11. Thus, the optical ferrule 13 is completed.

As the resin used for the positioning block 11 and the ferrule main body 12, a resin used for an optical ferrule for a general commercially available MT connector, for example, PPS (polyphenylene sulfide), an epoxy resin and the like can be used. Note that an inexpensive resin different from that used for the positioning block 11 may also be used for the ferrule main body 12.

However, it is most preferable to use the same resin. For example, a thermoplastic resin such as PPS is used for both of the positioning block 11 and the ferrule main body 12, and the positioning block 11 is overmolded with the thermoplastic resin by injection molding. Thus, the ferrule main body 12 can be formed. In the overmolding, a contact surface of the positioning block 11 with the resin filled for overmolding may be melted. As means for melting the contact surface, for example, induction heating can be employed. When the contact surface is melted, the positioning block 11 and the ferrule main body 12 can be firmly integrally connected to each other.

To be more specific, the following steps can be employed. Specifically, when the resin for overmolding injected into the mold is cooled and cured to some extent, the resin is temporarily heated by an induction heater or the like installed in the mold, for example, to melt the contact surface. Thereafter, the resin is cooled. As heating means, not only the induction heater but also various heating means can be employed. However, in this case, the surface of the positioning block 11 does not always have to be melted in the overmolding.

Moreover, in the optical ferrule 13 described above, the positioning block 11 has a simple shape having a cross-sectional shape uniform in the front-back direction of the ferrule. However, as disclosed in Patent Document 1, the positioning block 11 and the ferrule main body 12 can also be firmly connected to each other by providing protrusions at appropriate spots on the side of the positioning block. However, in this case, when the protrusions or the like are set to be extremely large, distortion may occur. Thus, it is required to suppress the size of the protrusions so as not to depart from the scope of the invention.

Compared with a chip unit having a nonuniform shape with extreme protrusions in the front-back direction of the ferrule as in Patent Document 1, the present invention achieves a simple structure of the mold used for resin molding. In addition, the present invention reduces costs for the mold and also facilitates process management of manufacturing. Moreover, molding accuracy for the positioning block 11 made of resin can be significantly improved.

However, as described above, there may be a case where the positioning block 11 has a nonuniform cross-sectional shape in the front-back direction of the ferrule. Therefore, the scope of the present invention also includes a case where some modifications or changes are made in the cross-sectional shape. However, it is most preferable that the positioning block 11 of the present invention has a cross-sectional shape completely uniform in the front-back direction of the ferrule.

Note that, in either case, as described above, the positioning block 11 is set to be vertically symmetrical about the center transversal line 17f (see FIG. 4). Moreover, the positioning block 11 is also set to be horizontally symmetrical about a vertical line (not shown) that is vertically provided in the center of the center transversal line.

Figure 1A:
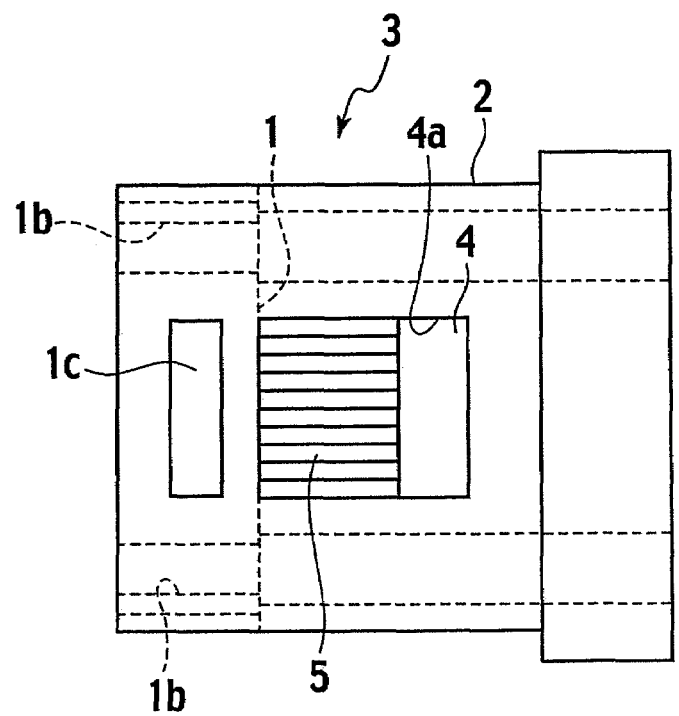
FIG. 1A is a plan view and FIG. 1B is a longitudinal cross-sectional view showing a conventional optical ferrule.
Figure 1B:
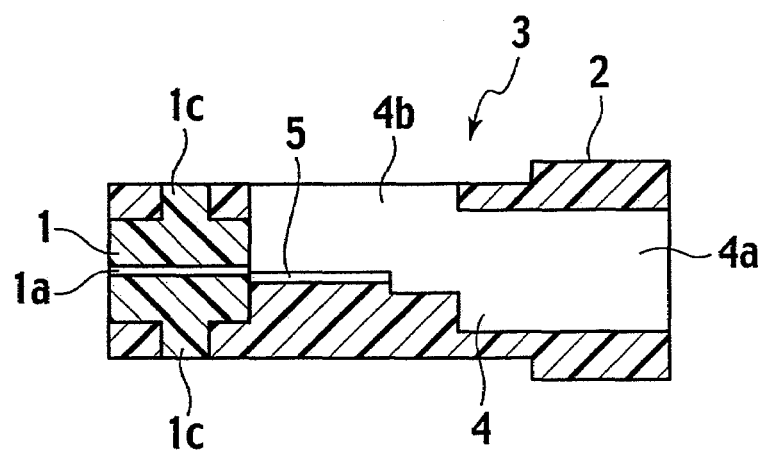
Figure 2:
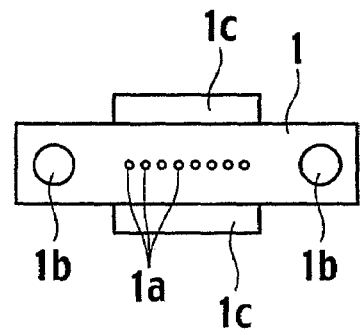
FIG. 2 is a front view showing only a positioning block in FIGS. 1A and 1B.

To be more specific, in the cross-sectional shape in which the guide pin hole formation portions 17 are set to be protrusions protruding outward from the optical fiber insertion hole formation portion 16, occurrence of shrinkage strain is further reduced since the positioning block 11 shrinks in a balanced manner as a whole in cooling and curing thereof compared with the case of formation of the conventional positioning block 1 having a rectangular cross-section shown in FIGS. 1 and 2. Therefore, the present invention is effective in highly accurate molding of the positioning block. Particularly, according to the present invention, each of the guide pin hole formation portions 17 has the contour portion 17a having an approximately arc shape, which is approximately concentric to the guide pin hole 11b. Thus, the wall thickness t around the guide pin hole 11b is set approximately uniform.

Moreover, the difference between the wall thickness t and the thickness m can be set very small. Here, the wall thickness t is a thickness of the positioning block 11 around the guide pin hole 11b, and the thickness m is a thickness of the positioning block 11 between the uppermost or lowermost array of the optical fiber insertion holes 11a and the upper or lower surface of the positioning block 11. Therefore, the resin shrinks in a balanced manner as a whole in cooling and curing thereof. Thus, unbalanced shrinkage is suppressed and the molding accuracy is improved.

Moreover, the boundaries (connected portions) between the optical fiber insertion hole formation portion 16 and the guide pin hole formation portions 17 are formed so as to have the round shape. Since the connected portions have no edges, occurrence of distortion can be suppressed.

Note that the thickness m and the wall thickness t around the pin hole are preferably 0.25 mm to 0.75 mm, most preferably, 0.7 mm.

Furthermore, in the positioning block 11 having the cross-sectional structure as described above, the resin smoothly flows inside the mold during molding and the shrinkage strain is unlikely to occur in cooling and curing.

Moreover, a cross-sectional area of the positioning block 11 when viewed from the connection end face side is smaller than that of the conventional positioning block having the rectangular cross-section. Therefore, the positioning block 11 can be molded with less resin than that required for the conventional positioning block described above. Thus, there is an advantage that occurrence of the shrinkage strain in cooling is suppressed. Since occurrence of the shrinkage strain is suppressed, highly accurate molding can be performed compared with the conventional positioning block.

Here, the cross-sectional area of the positioning block 11 will be described. In FIG. 4, reference numerals 17b and 17c denote extended lines of the upper and lower surfaces of the positioning block 11. Reference numerals 17d and 17e denote tangent lines passing through tops of the contour portions of the positioning block 11, the tangent lines being perpendicular to the extended lines 17b and 17c.

Figure 5:
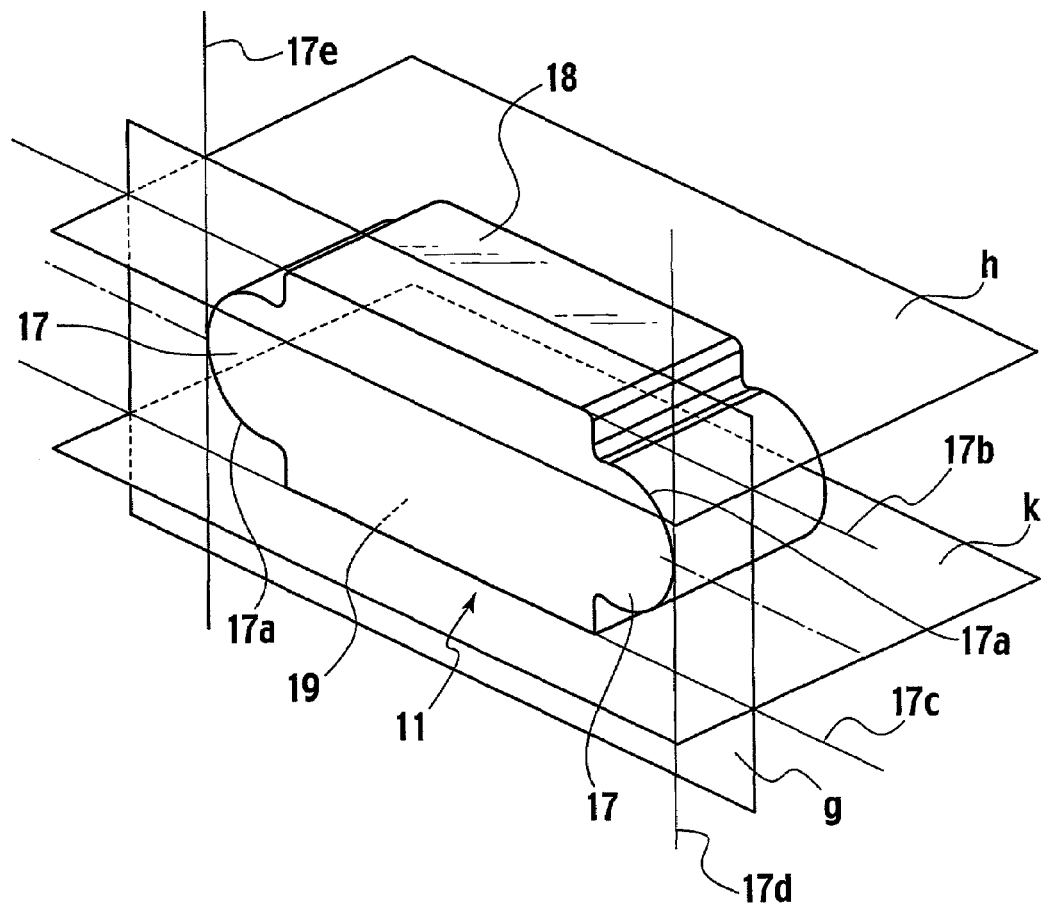
FIG. 5 is a perspective view for explaining a cross-sectional area of the positioning block in FIG. 3.

Specifically, as shown in FIG. 5, an intersection line between a plane g and a plane h is the extended line (first intersection line) 17b. Here, the plane g includes a front end face of the positioning block 11, and the plane h includes the upper surface 18 of the positioning block 11. Moreover, an intersection line between the plane g and a plane k is the extended line (second intersection line) 17c. Here, the plane k includes the lower surface 19 of the positioning block 11. Furthermore, two vertical lines which are perpendicular to the extended lines 17b and 17c and tangent to the guide pin hole formation portions 17 are extended lines (first and second vertical lines) 17d and 17e.

The cross-sectional area of the positioning block 11 according to the present invention is smaller than a cross-sectional area of a rectangle surrounded by the four lines 17b to 17e described above.

Second Embodiment

Figure 7:
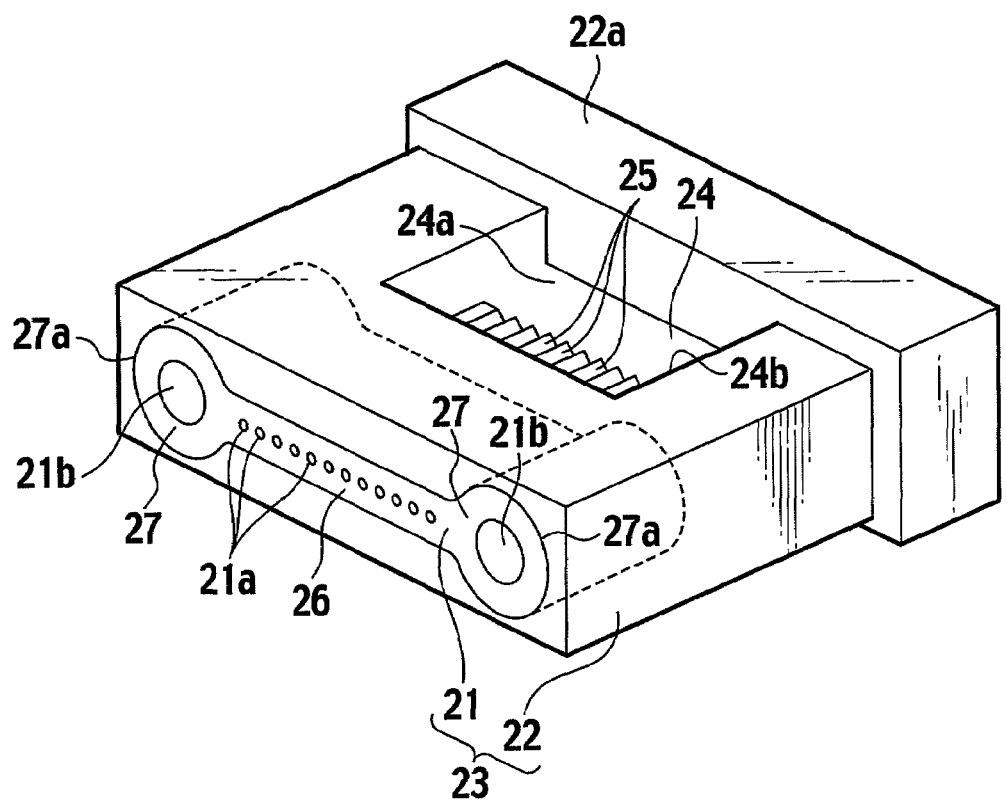
FIG. 7 is a perspective view showing an optical ferrule according to another embodiment of the present invention.
Figure 8:
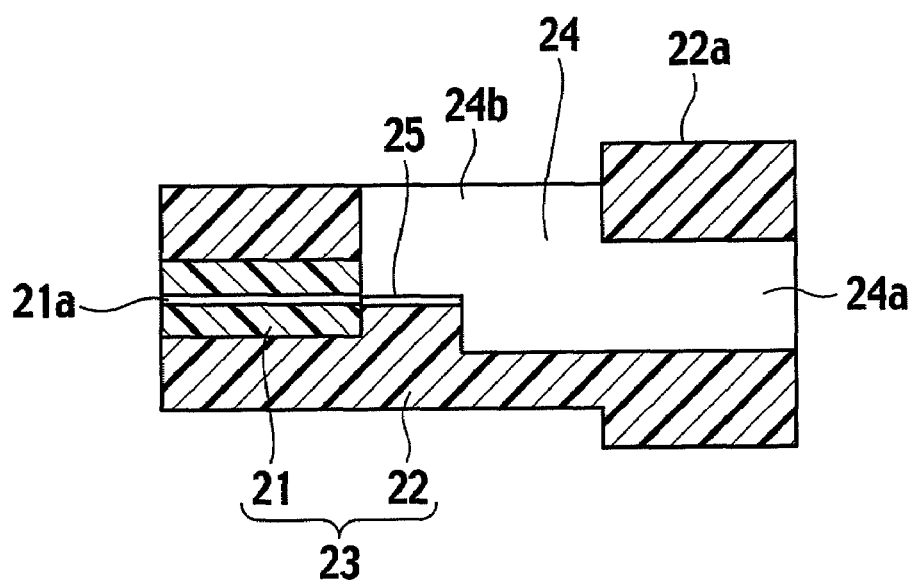
FIG. 8 is a longitudinal cross-sectional view of the optical ferrule in FIG. 7.

FIG. 7 is a perspective view showing an optical ferrule 23 according to another embodiment of the present invention. FIG. 8 is a longitudinal cross-sectional view of the optical ferrule shown in FIG. 7.

The optical ferrule 23 according to a second embodiment of the present invention includes a positioning block 21 and a ferrule main body 22 formed by molding a resin over the positioning block 21. The positioning block 21 includes: an optical fiber insertion hole formation portion 26 having a plurality of optical fiber insertion holes 21a arranged in a row; and guide pin hole formation portions 27 which are positioned on both sides of the optical fiber insertion hole formation portion 26 and which have guide pin holes 21b. However, the number of rows of the optical fiber insertion holes is not limited to 1.

The positioning block 21 is formed by molding a resin. The positioning block 21 has a cross-sectional shape uniform in a front-back direction (approximately horizontal direction in FIG. 6). The optical fiber insertion hole formation portion 26 and the guide pin hole formation portions 27 are integrally formed by molding. The optical fiber insertion hole formation portion 26 in the second embodiment has a vertical width smaller than that of the optical fiber insertion hole formation portion 16 in the first embodiment and has a rectangular cross-section. Specifically, the vertical width of the optical fiber insertion hole formation portion 26 is uniform and smaller than a vertical width of each of the guide pin hole formation portions 27.

Each of the guide pin hole formation portions 27 has a contour portion 27a having an arc shape, which is approximately concentric to the guide pin hole 21b and which has a center angle larger than 180 degrees.

In the vertical direction in FIG. 7, the width of the optical fiber insertion hole formation portion 26 is smaller than that of the guide pin hole formation portion 27. Therefore, the positioning block 21 has a dumbbell-shaped cross-section (or a spectacles-shaped cross-section) as a whole. Boundaries (connected portions) between the guide pin hole formation portions 27 and the optical fiber insertion hole formation portion 26 are formed so as to have a round shape as in the case of the first embodiment.

As in the case of the first embodiment, the center of the arc shape of the contour portion 27a is concentric to the guide pin hole 21b. Therefore, a wall thickness t (see FIG. 4) around the guide pin hole 21b in the guide pin hole formation portion 27 is approximately uniform.

Note that, although not particularly shown in the drawings, the wall thickness t means a width for which a horizontal transversal line traverses the guide pin hole formation portion 27, the horizontal transversal line traversing the center in the vertical direction of the positioning block 21, as in the case of the first embodiment.

Moreover, as in the case of the first embodiment, a difference between the wall thickness t and a thickness m is set very small. Here, the wall thickness t is a thickness around the guide pin hole 21b and a thickness m (not shown) is a thickness between the row of the optical fiber insertion holes 21a and an upper or lower surface of the positioning block 21. The thickness m is synonymous with that defined in the first embodiment. Specifically, a distance between an edge of the row of the optical fiber insertion holes and each of the upper and lower surfaces of the positioning block is set almost the same as the wall thickness t around the guide pin hole 21b. The thickness m and the wall thickness t are preferably 0.25 mm to 0.75 mm, most preferably, 0.7 mm.

After the positioning block 21 is previously resin-molded, the ferrule main body 22 is formed by molding a resin over the positioning block 21. The ferrule main body 22 has a hollow part 24 including an optical fiber introduction opening 24a and an adhesive filling window 24b, and also has a flange 22a at a rear end side of the optical ferrule (the right end side in FIG. 6). Since the ferrule main body 22 is formed by overmolding, the optical ferrule 23 in which the positioning block 21 and the ferrule main body 22 are integrated is completed.

Moreover, as in the case of the first embodiment, fitting pin holes (guide pin holes) are formed by use of a mold for forming the fitting pin holes (guide pin holes).

As in the case of a general MT connector, guide grooves 25 for guiding optical fibers into the optical fiber insertion holes 21a in the positioning block 21 can be formed at a position facing the adhesive filling window 24b of the hollow part 24 in the ferrule main body 22. Note that the guide grooves 25 are the structure employed in the general commercially available MT connector and thus description thereof will be omitted.

Since other molding steps and the case of no adhesive filling window 24b are the same as those in the first embodiment, description thereof will be omitted.

In the optical ferrule 23 according to the second embodiment, the dumbbell-shaped (spectacles-shaped) cross-section of the positioning block reduces the wall thickness of the optical fiber insertion hole formation portion 26. Thus, the positioning block 21 can be miniaturized. The amount of resin is reduced by the miniaturization and the entire volume of the positioning block is relatively balanced. Thus, as in the case of the first embodiment, the positioning block in this embodiment is advantageous for accurate molding.

Specifically, as in the case of the first embodiment, a cross-sectional area of the positioning block 21 when viewed from the connection end face side is smaller than that of the conventional positioning block having the rectangular cross-section. Therefore, the positioning block 21 can be molded with less resin than that required for the conventional positioning block described above. Thus, there is an advantage that occurrence of shrinkage strain in cooling is suppressed. Since occurrence of the shrinkage strain is suppressed, highly accurate molding can be performed compared with the conventional positioning block.

The cross-sectional area of the positioning block 21 in the second embodiment can also be defined in the same manner as that of the positioning block 11 in the first embodiment. Specifically, the planes h and k defined in the first embodiment can be defined, respectively, as planes (not shown) tangent to peripheries of the both guide pin hole formation portions 27. Moreover, a rectangle is defined as surrounded by two intersection lines and two vertical lines. Here, the two intersection lines are the lines between the above two planes and a plane (not shown) including a front end face of the positioning block 21, and the two vertical lines are the lines perpendicular to the intersection lines and tangent to the guide pin hole formation portions 27. The cross-sectional area of the positioning block 21 according to the present invention is smaller than that of the above rectangle.

Moreover, as in the case of the optical ferrule 13 described above, the optical ferrule 23 in the second embodiment has a simple structure of the mold. Thus, costs are reduced. Furthermore, the resin smoothly flows inside the mold and the shrinkage strain is unlikely to occur in cooling and curing. Thus, the optical ferrule 23 in the second embodiment is advantageous for accurate molding.

As already described in the first embodiment, it is important to reduce the total amount of resin and to eliminate unevenness in the wall thickness for accurate molding.

Note that the description has been given of the case where there is one row of optical fiber insertion holes (the case of one-dimensional arrangement) as the embodiment of the optical ferrule including the positioning block having the dumbbell-shaped cross-section. However, the present invention is not limited to the above case, and the positioning block can be set to have the dumbbell-shaped cross-section also in the case where there are a small number of multiple rows, such as two rows and three rows, of optical fiber insertion holes (the case of two-dimensional arrangement).

To sum up the first and second embodiments described above, the present invention has at least the following effects.

The optical ferrule according to the present invention has the cross-sectional shape in which the guide pin hole formation portions in the positioning block made of resin are set to be protrusions protruding outward from the optical fiber insertion hole formation portion. Thus, the cross-sectional area of the positioning block is smaller than that of the conventional positioning block having the rectangular cross-section. This means that the volume of the positioning block is smaller than that of the conventional positioning block. Therefore, the positioning block can be molded with less resin than that required for the conventional positioning block.

The molding with less resin generally suppresses the shrinkage strain in cooling. In this regard, highly accurate molding can be performed compared with the conventional positioning block having the rectangular cross-section.

Particularly, there is a small difference between the thickness around the pin hole and the thickness between the uppermost or lowermost array of the optical fiber insertion holes and the upper or lower surface of the positioning block. Thus, the portions around the holes shrink in a balanced manner in cooling and curing. Thus, the molding accuracy can be improved.

In this case, a portion protruding from the optical fiber insertion hole formation portion has an arc-shaped contour. Thus, the resin flows more smoothly inside the mold during molding and shrinks in a balanced manner as a whole in cooling and curing thereof. Thus, occurrence of the shrinkage strain is further reduced. Therefore, the present invention is more advantageous for highly accurate molding of the positioning block.

Moreover, compared with the case of molding of the conventional positioning block having the rectangular cross-section, the resin smoothly flows inside the mold during molding and the shrinkage strain is unlikely to occur in cooling and curing. Therefore, the present invention is more advantageous for highly accurate molding of the positioning block.

Furthermore, the connected portions and boundaries between the guide pin hole formation portions and the optical fiber insertion hole formation portion are set to have the round shape. Thus, the resin smoothly flows inside the mold for molding the positioning block made of resin. Consequently, occurrence of shrinkage strain at the connected portions can be suppressed.

In addition, the edges of the upper and lower surfaces of the positioning block are set to have a round shape. Thus, the above effect can be further enhanced.

Moreover, in the case where there is one row or a few rows of optical fiber insertion holes, the positioning block is set to have the dumbbell-shaped (or spectacles-shaped) cross-section. Thus, the thickness of the optical fiber insertion hole formation portion can be reduced. Consequently, the positioning block can be reduced in size and weight.

Moreover, the volume of the resin in the entire positioning block is relatively balanced, which is advantageous for accurate molding.

Since the resin-molded component can be manufactured with high accuracy as described above, optical connection characteristics of the optical ferrule using the positioning block can be significantly improved.

In the method for manufacturing an optical ferrule according to the present invention, the positioning block and the ferrule main body are made of the same kind of thermoplastic resin. Moreover, the positioning block and the ferrule main body are integrally connected to each other by melting the contact surface of the positioning block with the overmolding resin. Thus, the positioning block and the ferrule main body are firmly integrally connected to each other. Therefore, the method is suitable for implementing the present invention having a uniform cross-sectional shape in the front-back direction of the ferrule.

Note that, use applications of the optical ferrule in the present invention include not only an application of an optical ferrule installed in an optical connector housing but also the case where the optical ferrule is used as a terminal component for an interface provided between optical fibers and other optical elements.

What is claimed is:

1. An optical ferrule comprising:
a positioning block including an optical fiber insertion hole formation portion having optical fiber insertion holes and guide pin hole formation portions which are provided on both sides of the optical fiber insertion hole formation portion and which have guide pin holes; and
a ferrule main body having the positioning block disposed on a front end side of the ferrule main body and having a hollow part on a rear end side of the ferrule main body, wherein
the optical fiber insertion hole formation portion and the guide pin hole formation portions are integrally formed,
the ferrule main body is integrally formed by molding a resin over the positioning block,
a front end face of the positioning block is a connection end face,
the hollow part is positioned behind the positioning block,
the optical fiber insertion holes penetrate the positioning block in a front-back direction and thus have their one ends opened in the connection end face and other ends opened in the hollow part, and
the guide pin hole formation portions are formed so as to protrude outward from the both sides of the optical fiber insertion hole formation portion and to have arc-shaped contour portions.

2. The optical ferrule according to claim 1, wherein
each of the contour portions is formed so as to have an arc shape which is concentric to the guide pin hole and which has a center angle larger than 180 degrees, and
a vertical width of the optical fiber insertion hole formation portion is smaller than that of each of the guide pin hole formation portions.

3. The optical ferrule according to claim 1, wherein
when two intersection lines between a plane including a front end face of the positioning block and a plane including an upper surface of the positioning block and between the plane including the front end face of the positioning block and a plane including a lower surface of the positioning block are set as first and second intersection lines, respectively, while two vertical lines which are perpendicular to the first and second intersection lines and tangent to the guide pin hole formation portions are set as first and second vertical lines, respectively, a cross-sectional area of the positioning block when viewed in the front-back direction is smaller than an area surrounded by the first and second intersection lines and the first and second vertical lines.

4. The optical ferrule according to claim 2, wherein
when intersection lines between a plane including the front end face of the positioning block and two planes tangent to the guide pin hole formation portions on both sides in the vertical direction are set as first and second intersection lines, respectively, while two vertical lines which are perpendicular to the first and second intersection lines and tangent to the guide pin hole formation portions are set as first and second vertical lines, respectively, a cross-sectional area of the positioning block when viewed from the front-back direction is smaller than an area surrounded by the first and second intersection lines and the first and second vertical lines.

5. The optical ferrule according to claim 1, wherein
connected portions between the guide pin hole formation portions and the optical fiber insertion hole formation portion are set to have a round shape.

6. The optical ferrule according to claim 2, wherein
connected portions between the guide pin hole formation portions and the optical fiber insertion hole formation portion are set to have a round shape.

7. The optical ferrule according to claim 5, wherein
edges of upper and lower surfaces of the positioning block have a round shape.

8. The optical ferrule according to claim 6, wherein
edges of upper and lower surfaces of the positioning block have a round shape.

9. A method for manufacturing the optical ferrule according to claim 1, the method comprising:
using the same kind of thermoplastic resin for both of the positioning block and the ferrule main body;
melting a contact surface of the positioning block with overmolding resin in overmolding the positioning block with the ferrule main body; and
integrally connecting the positioning block and the ferrule main body.

10. A method for manufacturing the optical ferrule according to claim 1, the method comprising:
when molding a thermoplastic resin over the positioning block to form the ferrule main body, the thermoplastic resin being of the same kind as that for the positioning block,
melting a contact surface of the positioning block with overmolding resin; and
integrally connecting the positioning block and the ferrule main body.

11. A method for manufacturing the optical ferrule according to claim 2, the method comprising the steps of:
when molding a thermoplastic resin over the positioning block to form the ferrule main body, the thermoplastic resin being of the same kind as that for the positioning block,
melting a contact surface of the positioning block with overmolding resin; and
integrally connecting the positioning block and the ferrule main body.

* * * * *